(12) United States Patent
Nagarajan

(10) Patent No.: US 8,019,695 B2
(45) Date of Patent: *Sep. 13, 2011

(54) CUSTOMIZED SYSTEM AND METHOD OF BILLING FOR PRINTING SERVICE COSTS BY EXAMINING THE CONTENTS OF PRINTED PAGES

(75) Inventor: Ramesh Nagarajan, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 628 days.

This patent is subject to a terminal disclaimer.

(21) Appl. No.: 12/106,036

(22) Filed: Apr. 18, 2008

(65) Prior Publication Data

US 2009/0265286 A1 Oct. 22, 2009

(51) Int. Cl.
*G06Q 99/00* (2006.01)
(52) U.S. Cl. ..... 705/400; 705/7.35; 358/3.02; 358/3.09; 358/1.15; 358/1.9
(58) Field of Classification Search .................. 705/400; 358/1.8, 1.15, 1.9, 3.02, 3.09; 399/79
See application file for complete search history.

(56) References Cited

U.S. PATENT DOCUMENTS

| | | | | |
|---|---|---|---|---|
| 6,064,838 A * | 5/2000 | Maruta et al. | ................ | 399/79 |
| 6,356,359 B1 * | 3/2002 | Motamed | ................ | 358/1.8 |
| 7,239,422 B2 * | 7/2007 | Braun et al. | ................ | 358/1.9 |
| 2003/0020951 A1 * | 1/2003 | Minowa et al. | ............. | 358/1.15 |
| 2006/0074816 A1 * | 4/2006 | Hibara et al. | .............. | 705/400 |

OTHER PUBLICATIONS

Plain, Stephen W., "Colorfast: New Color Inkjets Approach Photographic Quality at Bargain-Basement Prices", Feb. 1996, Computer Shopper, v16, n2, p. 130(10).*

* cited by examiner

*Primary Examiner* — John Hayes
*Assistant Examiner* — Freda A Nelson
(74) *Attorney, Agent, or Firm* — Pillsbury Winthrop Shaw Pittman LLP

(57) ABSTRACT

A system and method of billing for printing service costs is provided to examine content of a page and apply a cost function to approximate the cost of printing the page. Examining the page may include detecting an object in the page, determining a type of the detected object, and determining an approximate area of coverage of the detected object within the page. A usage profile of each type of detected object that is printed is calculated and stored. The cost function uses the detected object, the approximate area of coverage, and a weight value associated with the type of detected object to approximate the cost of the page. When costs are calculated over a period of time, the weight value of each type of detected object may be adjusted based on the usage profile for each type of detected object.

16 Claims, 5 Drawing Sheets

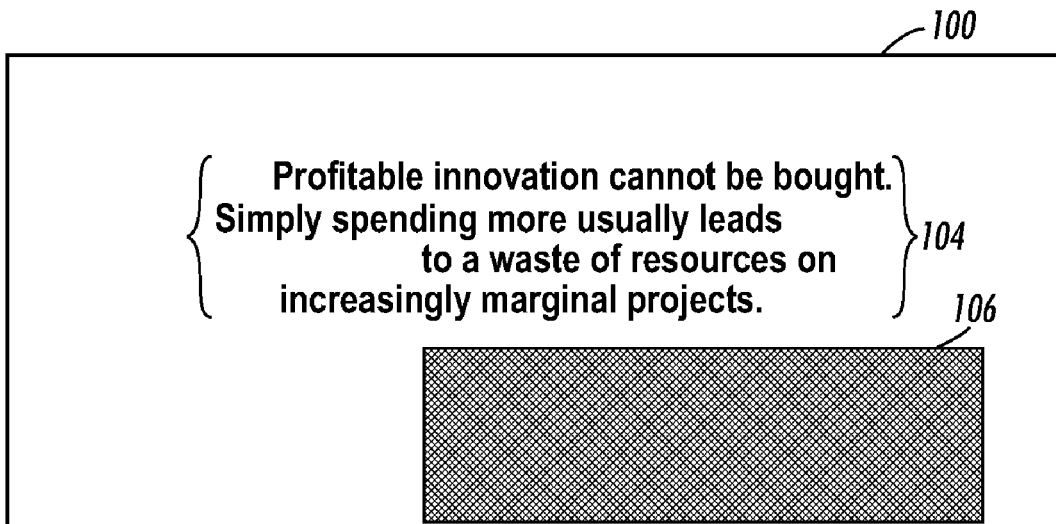

{ Profitable innovation cannot be bought. Simply spending more usually leads to a waste of resources on increasingly marginal projects. } mon sense: Spending beyond a certain point on any development portfolio should result in lower returns, since a company will naturally invest in the best projects first, the next-best after that, and so on, until it is tossing good money away on more and more dubious project. Exhibit 1 illustrates this phenomenon by contrasting the innovation ROI of the two companies with very different portfolios. We call the marginal return on innovation investment the *innovation effectiveness curve*. The larger the area under the curve, the better the firm's innovation effectiveness.

Each company - and possibly each separate business unit - has an intrinsic innovation effectiveness curve, which can be drawn easily by plotting the ROI of each project in the development pipeline and the cumulative innovation investment. The curve is very important: It predicts the company's future revenue, profit, and growth derived from new products. Moreover, even though projects within a portfolio change, we have found that a company's innovation

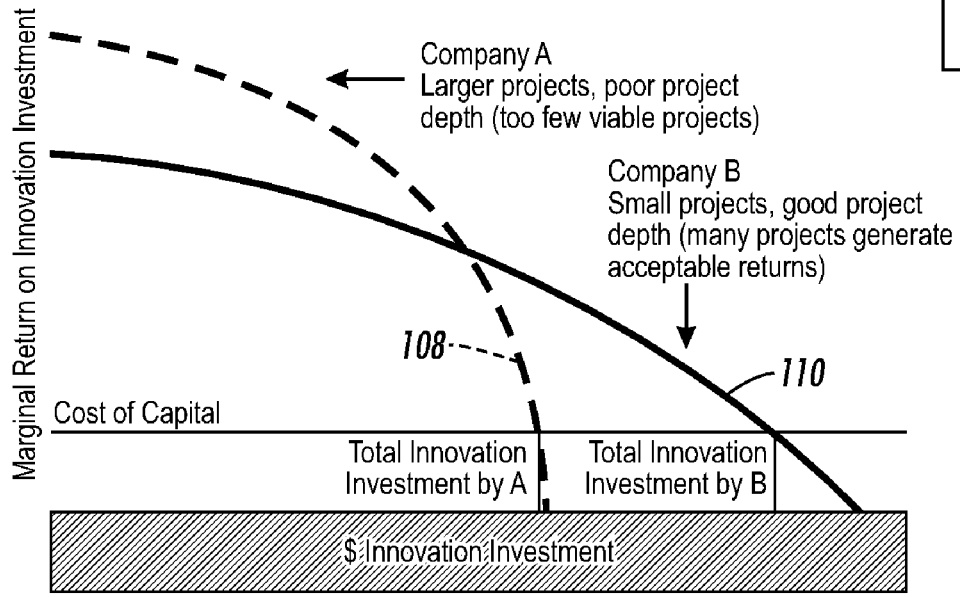

Exhibit 1: The Innovation Effectiveness Curve

FIG. 1A

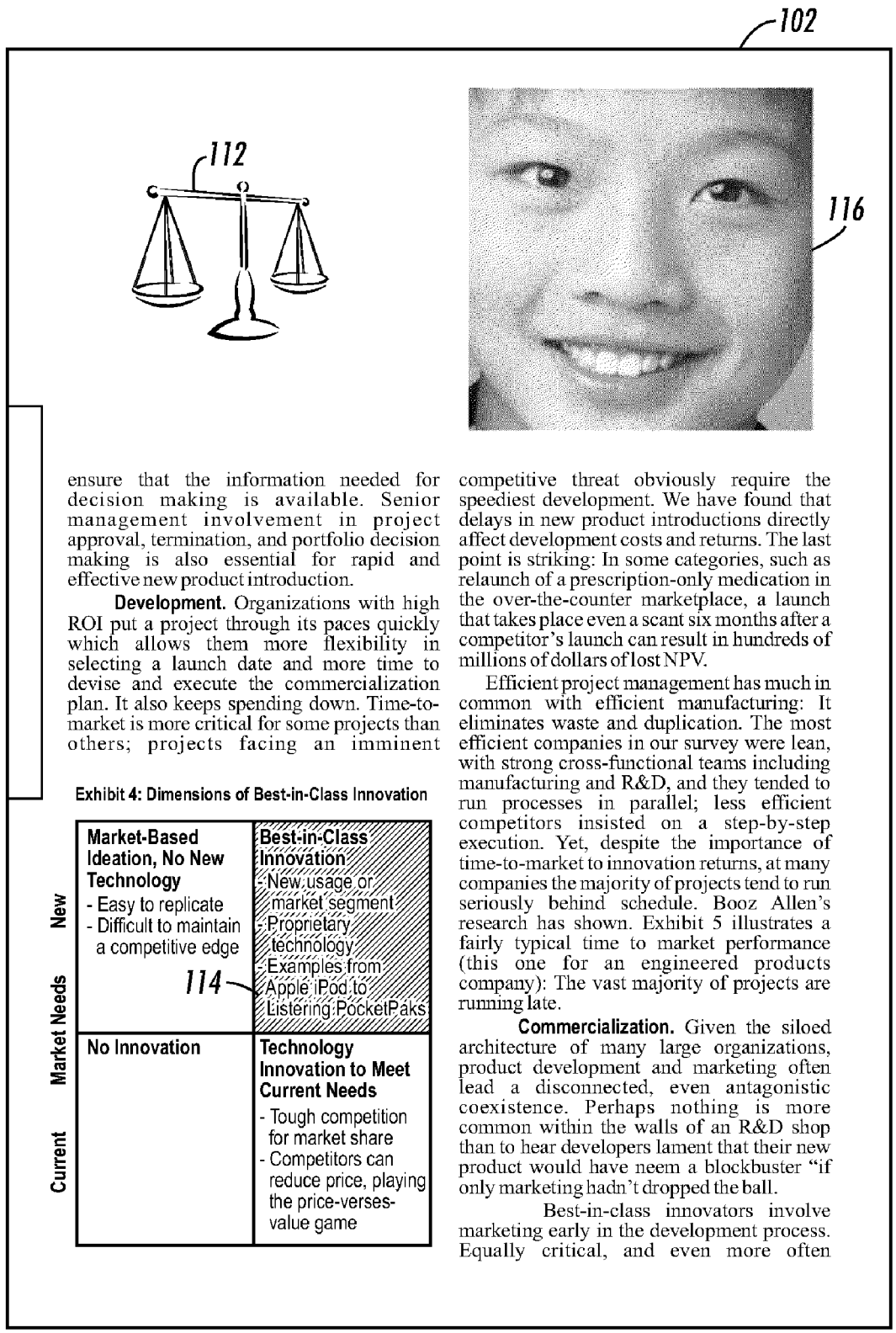

ensure that the information needed for decision making is available. Senior management involvement in project approval, termination, and portfolio decision making is also essential for rapid and effective new product introduction.

Development. Organizations with high ROI put a project through its paces quickly which allows them more flexibility in selecting a launch date and more time to devise and execute the commercialization plan. It also keeps spending down. Time-to-market is more critical for some projects than others; projects facing an imminent competitive threat obviously require the speediest development. We have found that delays in new product introductions directly affect development costs and returns. The last point is striking: In some categories, such as relaunch of a prescription-only medication in the over-the-counter marketplace, a launch that takes place even a scant six months after a competitor's launch can result in hundreds of millions of dollars of lost NPV.

Efficient project management has much in common with efficient manufacturing: It eliminates waste and duplication. The most efficient companies in our survey were lean, with strong cross-functional teams including manufacturing and R&D, and they tended to run processes in parallel; less efficient competitors insisted on a step-by-step execution. Yet, despite the importance of time-to-market to innovation returns, at many companies the majority of projects tend to run seriously behind schedule. Booz Allen's research has shown. Exhibit 5 illustrates a fairly typical time to market performance (this one for an engineered products company): The vast majority of projects are running late.

Commercialization. Given the siloed architecture of many large organizations, product development and marketing often lead a disconnected, even antagonistic coexistence. Perhaps nothing is more common within the walls of an R&D shop than to hear developers lament that their new product would have neem a blockbuster "if only marketing hadn't dropped the ball.

Best-in-class innovators involve marketing early in the development process. Equally critical, and even more often

Exhibit 4: Dimensions of Best-in-Class Innovation

|  | | New | Current |
|---|---|---|---|
| Market Needs | | Market-Based Ideation, No New Technology<br>- Easy to replicate<br>- Difficult to maintain a competitive edge | No Innovation |
| | | Best-in-Class Innovation<br>- New usage or market segment<br>- Proprietary technology<br>- Examples from Apple iPod to Listerine PocketPaks | Technology Innovation to Meet Current Needs<br>- Tough competition for market share<br>- Competitors can reduce price, playing the price-verses-value game |

FIG. 1B

| DETERMINED COST FOR PRINTING A PAGE | PAGE TYPE | TOTAL AREA OF COVERAGE OF MONOCHROME OBJECTS | TOTAL AREA OF COVERAGE OF COLOR OBJECTS | ADDITIONAL REQUIREMENTS |
|---|---|---|---|---|
| C1 | MONOCHROME | LESS THAN T1 | NA | NA |
| C2 | MONOCHROME | GREATER THAN OR EQUAL TO T1 | NA | NA |
| C3 | COLOR | NA | LESS THAN T2 | $G*w1+LFHT*w2+HFHT*w3+SF*w4+C*w5=0$ (PAGE CANNOT INCLUDE ANY COLOR, G, LFHT, HFHT, SF, OR CON OBJECTS) |
| C4 | COLOR | NA | LESS THAN T3 | $G*w1+LFHT*w2+HFHT*w3+SF*w4+CON*w5$ MUST BE LESS THAN T4 |
| C5 | COLOR | NA | GREATER THAN OR EQUAL TO T4 | $G*w1+LFHT*w2+HFHT*w3+SF*w4+CON*w5$ MUST BE GREATER THAN OR EQUAL TO T4 |

| COSTS | C1, C2, C3, C4, C5 |
|---|---|
| THRESHOLDS | T1, T2, T3, T4 |
| WEIGHTS | W1, W2, W3, W4, W5 |
| G | TOTAL AREA OF COVERAGE OF COLOR GRAPHIC OBJECTS |
| LFHT | TOTAL AREA OF COVERAGE OF COLOR LOW FREQUENCY HALFTONE OBJECTS |
| HFHT | TOTAL AREA OF COVERAGE OF COLOR HIGH FREQUENCY HALFTONE OBJECTS |
| SF | TOTAL AREA OF COVERAGE OF COLOR SOLID FILL OBJECTS |
| CON | TOTAL AREA OF COVERAGE OF COLOR CONTONE OBJECTS |

FIG. 3

CUSTOMIZED SYSTEM AND METHOD OF BILLING FOR PRINTING SERVICE COSTS BY EXAMINING THE CONTENTS OF PRINTED PAGES

BACKGROUND

1. Field

The present disclosure is generally related to billing for printing costs, and, in particular, to a customizable system and method of billing for printing service costs by examining and weighing the content of pages that are printed.

2. Description of Related Art

As is known in the art, printing systems or output devices such as multi-function printers (MFPs) mark a printing substrate such as paper with multiple colors of ink or toner to produce color images. Color images may be printed in a variety of colors or comprise a single color (i.e., monochromatic).

Each color image comprises a number of pixels which correspond to a defined location in the image. Each pixel of an image is assigned a number representing the amount of light or gray level for that space or that particular spot, i.e., the shade of gray in the pixel. The pixels may be defined in terms of a color space (or gamut), typically with three values, such as RGB—R for red, G for green, and B for blue—or four values, such as CMYK—C for cyan, M for magenta, Y for Yellow, and K for black.

Images that have a large range of shades of grays are referred to as grayscale images. For example, an 8-bit value comprises 256 values or shades of gray for each pixel in the image. Grayscale image data may also be referred to as continuous tone images or contone images. In some instances, it is possible to create the impression of a continuous tone image by using a process such as halftoning, such that the image data is converted and "appears" to be a continuous tone image. The halftone process is generally known, and various methods for halftoning exist.

When printing color images (e.g., a monochromatic or monochrome image versus a color image), the quality and amount of image content of each page may affect the cost of printing. Generally, it is more efficient to use a black toner rather than a combination of color toner (or ink) as the cost of using multiple colors increases when printing color and/or monochrome pages. Therefore, users may tend to print binary grayscale images or decrease the printing of color images.

However, the cost of the toner is generally only about 20 percent to about 30 percent of the total cost per page that is incurred when using an output device or printing system such as an MFP. A user may be a customer and lease a printing system and be charged a "use" fee (e.g., monthly) and a "service" fee (e.g., when required or on a set schedule). The "use" fee is generally fixed; however, the "service" fee includes estimated fixed and variable costs, and a profit margin. Some of the estimated costs that are included in the service fee are toner usage costs, technician cost, repair costs, IT infrastructure costs, field offices costs, managers' and engineers' salaries, parts costs, labor costs, and the like. Thus, the service cost for printing color images may be significantly higher due to the number of costs included therein.

Some prior art systems have been designed charge a fixed amount for printed monochrome pages and another fee for printed color pages, regardless of the content in the printed page. However, such as "one size fits all billing approach" fails to take into account the objects that are in the page. Field data shows that there is a strong correlation between the service cost as compared to the page content or object types (e.g., text, line art, graphics, etc). For example, there are several types of monochrome and/or color objects that may be printed onto a substrate—monochrome low frequency halftone objects, color high frequency contone objects—which may affect the cost of printing a page. Therefore, color page prices may be lowered by limiting color service costs based on toner (or ink) usage.

Prior art methods have approximated the service cost associated with printing a page by applying a cost function that uses the aggregate toner area of coverage of the printed page, the printing medium substrate dimensions, and the finishing option applied. The aggregate toner area of coverage may be approximated by counting the aggregate number of color pixels (e.g., counting the number of the CMYK pixels within an object). This method does not take into account how the color pixels are distributed in a page (e.g., how the pixels are distributed and/or clustered), the kinds of objects in the page the pixels are used to form, or the pixel density.

Ser. No. 11/873,113, filed Oct. 16, 2007, which is hereby incorporated by reference in its entirety, describes a method that includes detecting an object in the page and determining the approximate area of coverage of the detected object. This method and pricing model allows for determining how the color pixels are distributed in a page, the pixel density, and the type of object. However, this method generally assumes that the service cost is an exact or strict correlation of the current page content. Thus, the cost of a page was not updated based on the field data (e.g., the types of objects printed on the pages). The cost was fixed for the life of the machine or system and no field information was used to adjust the per-page cost to the customer or user.

In reality, the service cost of printing pages is a function of the object types (and their area of coverage) printed on a machine since its last service. For example, the service cost for printing color solid fill objects will be higher than printing monochrome text objects. Therefore, it is desirable not only to identify the type of objects being printing during the period of time between service visits, but to also apply a weight function for each object type printed to calculate the cost of printing such pages.

SUMMARY

One aspect of the disclosure provides a method of billing for printing service costs of a printing device. The printing device is configured to print documents comprising at least one page. The method includes: examining content of each page in the documents using an examination module. Examining the content of each page includes: (i) detecting at least one object in the page; (ii) determining a type of the at least one detected object within the page, and (iii) determining an approximate area of coverage of a detected object within the at least one object in the page. The method also includes calculating a usage profile of each type of detected object using a calculation module; storing the usage profile of each type of detected object in a memory; and applying a cost function to approximate a cost of printing the page using the at least one detected object, the determined approximate area of coverage of the at least one detected object, and a weight value, the weight value being associated with the type of the at least one detected object, wherein the approximate cost of printing for each page printed by the printing device is determined.

In an embodiment, the weight value associated with each type of detected object is adjusted based on the usage profile of the types of detected objects printed over a period of time.

Another aspect provides a billing system for printing service costs of a printing device for printing documents comprising at least one page. The billing system includes: an examination module configured for examining content of a page. The examination module includes: (i) a detection module configured for detecting at least one object in the page and detecting a type of the at least one object, and (ii) a coverage module configured for determining an approximate area of coverage of a detected object within the at least one object in the page. The billing system also includes a calculation module configured for calculating a usage profile of each type of detected object; a memory for storing the usage profile of each type of detected object; and a cost calculation module configured for applying a cost function to approximate a cost of printing the page using the detected object, the determined approximate area of coverage of the detected object, and a weight value, the weight value being associated with the type of the at least one detected object.

In an embodiment, upon calculating the printing service costs over a period of time, the cost calculation module of the billing system adjusts the weight value associated with each type of detected object based on the usage profile of each type of detected object.

Other objects and features of the present disclosure will become apparent from the following detailed description, the accompanying drawings, and the appended claims.

BRIEF DESCRIPTION OF THE DRAWINGS

FIGS. 1A and 1B show graphic representations of pages with text and objects therein in accordance with the present disclosure;

FIG. 3 is a chart depicting several approximated costs that may be used by the method of FIG. 2 to account for the service cost of printing a page in accordance with the present disclosure.

DETAILED DESCRIPTION OF THE PREFERRED EMBODIMENT(S)

Figure 2:
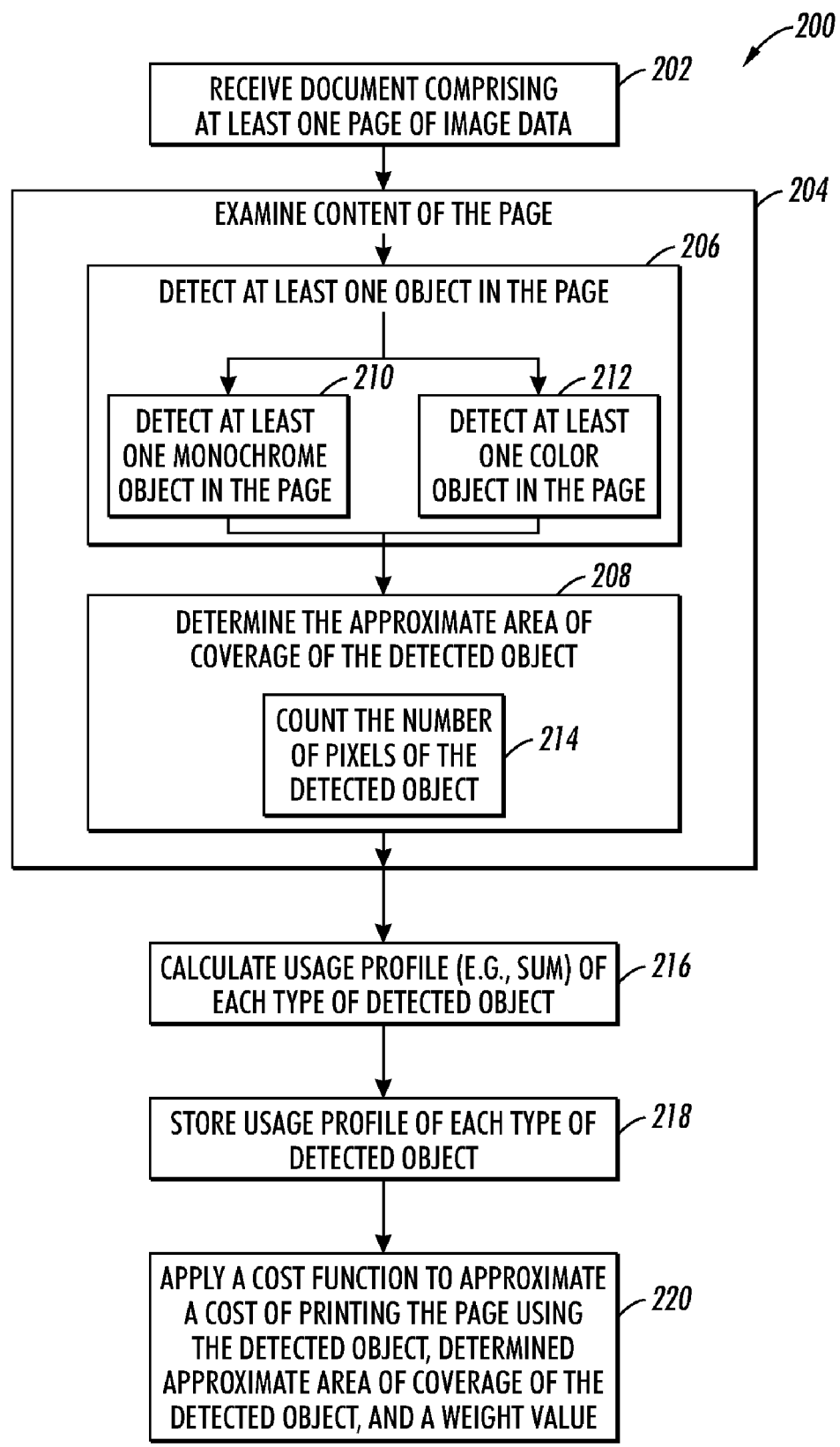
FIG. 2 is a flow chart diagram illustrating a method of customizing printing service costs in accordance with the present disclosure.

As noted above, Ser. No. 11/873,113, filed Oct. 16, 2007, which is hereby incorporated by reference in its entirely, describes a method that includes detecting an object in the page and determining the approximate area of coverage of the detected object. However, the cost of a page was not updated based on the field data (e.g., the types of objects printed on the pages). The types of objects printed on pages affect a user's or customer's service costs. For example, a user who prints a large plurality of high frequency halftone images is more likely to call for service more frequently as compared to a user who prints few high frequency halftone images and/or plain text images. In order to improve and customize the system and method of billing for printing service costs, this disclosure provides a method of detecting objects, calculating their usage (i.e., number of times they are printed), weighing the objects, and changing the costs based on the types of printed objects.

Referring now more particularly to the drawings, FIGS. 1A and 1B show pages 100 and 102, respectively. Page 100 includes color text object 104, color solid fill object 106, and color line art objects 108 and 110. Page 102 includes color graphic object 112, color low frequency halftone object 114, and color high frequency halftone object 116. The remaining objects on the pages 100 and 102 are monochrome text or line objects (i.e., black or of a single color). Pages 100 and 102 illustrate examples of pages that may be output by an output device. Generally, at least one page to be output is sent to an output device such as a printer or a printing system such as multifunction product device (MFP) that includes at least the capability to print, copy, and/or scan documents. The types of objects that may be included in a page are: monochrome contone objects, color contone objects, monochrome text objects, color text objects, monochrome line art objects, color line art objects, monochrome graphic objects, color graphic objects, monochrome low frequency halftone objects, color low frequency halftone objects, monochrome high frequency halftone objects, color high frequency halftone objects, monochrome solid fill objects, and color solid fill objects.

In order to determine each type of object, a number of techniques may be performed on the image data. In some instances, for each image the number of pixels per edge may be determined (e.g., counted) to thus assist in detecting the type of object in a page. For example, a higher number of edge pixels may indicate that an object comprises text/line art content, while lower number of edge pixels may indicate that an object comprises continuous tone image content.

For example, "monochrome" is generally defined for an object or image as comprising pixels having a range of shades corresponding to a single color, such as black toner (or ink). Grayscale images or objects, i.e., having shades of black (and white), are examples monochrome contone objects. "Color," on the other hand, is generally defined as comprising more than one color. Color contone objects may be defined as objects comprising pixels having a range of shades corresponding to more than one color. For example, in a CMYK color system, a color contone object or image may contain cyan and magenta toner (or ink). Monochrome text objects are defined as text (e.g., alphanumeric characters in English or any other textual or character based representations in other languages) printed with pixels in a single color, such as black. Color text objects are defined as objects or text printed whose pixels are determined to use more than one color, such as cyan and yellow, which generally produce another color that is visible to the human eye, such as green. Similarly, monochrome line art objects are defined as line objects that are printed in a single color, while color line art objects are defined as line objects that are printed using more than one color.

Monochrome graphic objects are defined as objects having a larger number of pixels arranged to form an edge defining a complex geometric shape and comprising a single color. Color graphic objects are defined as objects comprising a large number of pixels arranged to form at least one edge and comprising more than one color, such as color graphic object 112, for example.

Additionally, it is possible to create the impression of a contone image by using halftoning. The halftone process is generally known, and various methods for halftoning exist. A binary halftone process converts a contone image into a binary image; that is, the image data is converted to an image of black/color and white spots that "appear" to be a continuous tone. The frequency of the pixels, or the number of times pixels are provided in an image, determines if an image or objects is "low frequency" or "high frequency." Thus, monochrome low frequency halftone objects comprise objects having a smaller number of pixels of halftone image data in a single color, while monochrome high frequency halftone objects comprise objects having a larger number of pixels of halftone image data in a single color. Color low frequency halftone objects comprise objects having a smaller number of pixels of halftone image data in more than one color, while color high frequency halftone objects comprise objects having a larger number of pixels of halftone image data in more than one color. An example of a color high frequency halftone object may be a picture or a photograph, such as shown by object 116 on page 102, for example.

Generally, solid fill objects are defined as objects or images comprising a smaller number of pixels arranged to form a plurality of connected edges. Thus, monochrome solid fill objects comprise objects having a smaller number of pixels forming a plurality of connected edges in a single color, while color solid fill objects are objects having a smaller number of pixels forming a plurality of connected edges in more than one color. An example of a solid fill objects may be an area with the same color throughout, such as shown by color solid fill object 106, for example. As further described below, any number of techniques may be used to determine and/or categorize the type of object detected in a page.

A page that is to be output (i.e., printed) may take many forms, for example, such as pages 100 and 102, or other forms including text and/or graphic objects. A page is simply what is to be marked onto the printing substrate of the output device or printing system. Two pages may be marked on both sides of the substrate to form a double-sided sheet (e.g., a sheet of paper). A page may be a scanned page, an image of a page, a page description language page, a printed page, a copied page, a computer memory based page, a hard-drive based page, a raster page, a vector graphics page, or the like. Additionally or alternatively, pages 100 and 102 may be a representation of a page in printed form (e.g., printed pages) or in another form as previously mentioned.

Because there is a correlation between the service cost associated with a particular printed page and the page content (e.g., the objects in the page), examining the content of each page to be output allows for customizable system and method of billing. As previously noted, the additional service costs for printing color image data may include the type of object to be printed. For example, printing a 1×1 inch object on a page may have higher service cost if the object were a color high frequency halftone object as compared to a color low frequency halftone object or a monochrome line art object. Thus, the type of object(s) and an approximate area of coverage of the object(s) in each page should be considered. The "area of coverage" of an object may be a relative or absolute measurement. Also, the "area of coverage" of an object may be the number of pixels of the object and/or the area of the object. Additionally or alternatively, to determine the approximate area of coverage of an object in pages 100 and 102, the method may count the number of pixels of that object. Additionally, the pixels may be counted during the application of alternative techniques (e.g., ripping and/or using an auto-windowing technique on a page) or other techniques such as a segmentation and classification method may be used to determine and/or categorize the types of objects. In an embodiment, the total area of coverage of color pixels on a page as well as the area of coverage of individual objects may be determined.

Furthermore, the frequency or number of times an object is printed, for example, between service periods, by an output device or printing system may also affect the service cost. Therefore, as provided in the disclosed method further described with respect to FIG. 2, automatically collecting such information in the field would be beneficial. In this case, "automatically" collecting information refers to collecting information at the time an object is to be output. For example, as documents are copied or printed in a MFP, the object types in each page will be recorded. The number of each object type(s) may then be collected after determining the type of object. A weight value for each object type is used with the cost function to calculate the cost of printing such pages.

Figure 4:
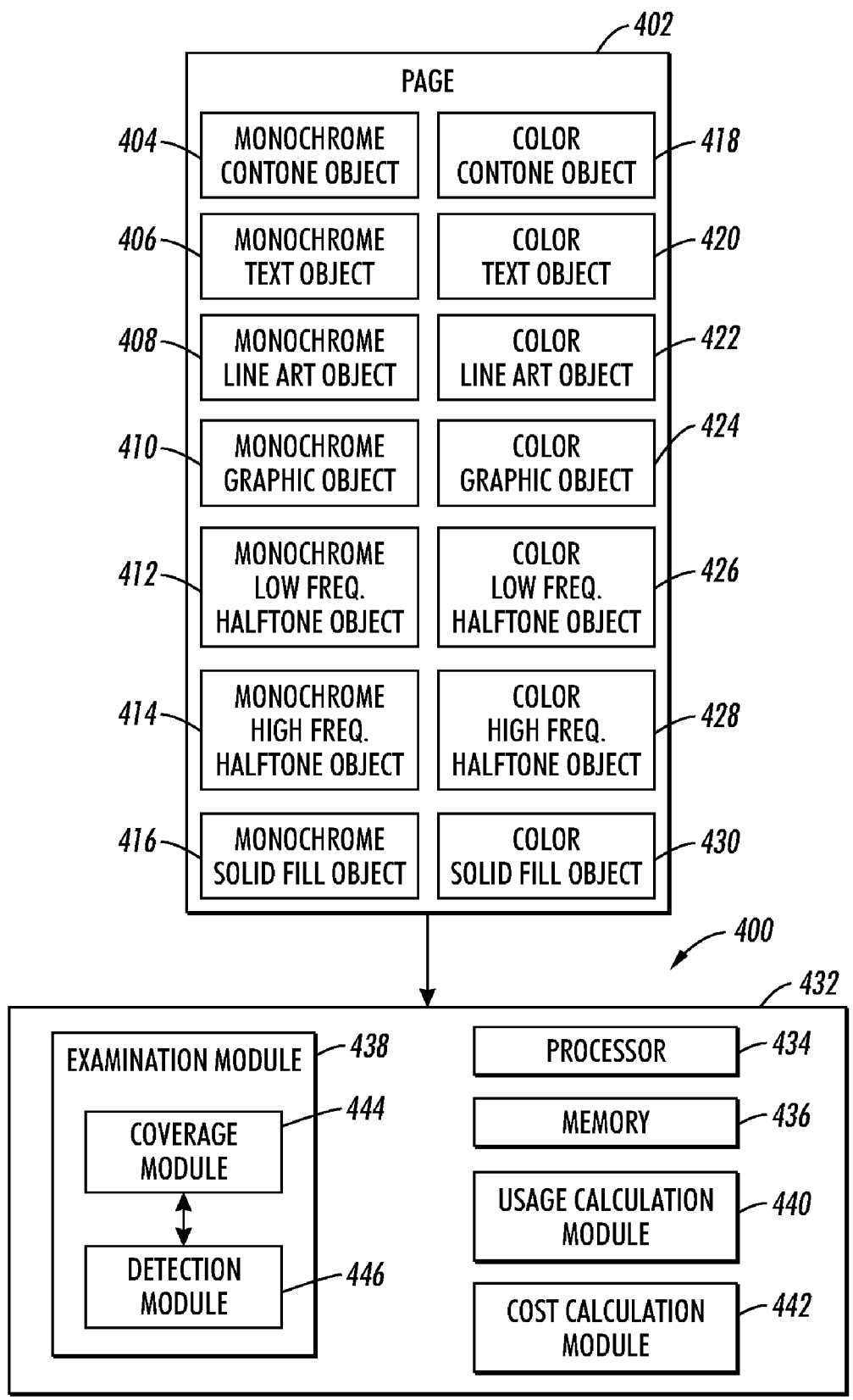
FIG. 4 is a block diagram illustrating a customizable billing system that may be used to bill printing service costs.

FIG. 2 is a flow chart diagram illustrating a method 200 of customizing printing service costs. The method 200 begins at step 202 by receiving a document comprising at least one page of image data. The page of image data in step 202 is representative of any type of page (e.g., pages 100 and 102 of FIGS. 1A and 1B) and may include a variety of objects to be detected and used by method 200; however, method 200 may use a page that includes any combinations of objects or no objects (e.g., text). For example, the page may include objects such as monochrome contone object 404, monochrome text object 406, monochrome line art object 408, monochrome graphic object 410, monochrome low frequency halftone object 412, monochrome high frequency (abbreviated as "freq." throughout FIG. 4) halftone object 414, monochrome solid fill object 416, color contone object 418, color text object 420, color line art object 422, color graphic object 424, color low freq. halftone object 426, color high freq. halftone object 428, or color solid fill object 430 as provided on page 402 which is shown in FIG. 4. Step 204 may examine content of the received page and include steps 206 and 208. Step 206 may detect at least one object in the received page while step 208 may determine the approximate area of coverage of the at least one detected object in the received page. The at least one object in the page that is referred to in step 206 may include one or more objects, such as those noted above.

As noted, step 206 includes steps 210 and 212. Step 210 may detect at least one monochrome object in the received page (e.g., one of objects 404 through 416), and step 212 may detect at least color object in the received page (e.g., one of objects 418 through 430). Step 212 may include additional steps (not shown) such as steps that may detect at least one color contone object, detect at least one color text object, detect at least one color line art object, detect at least one color graphic object, detect at least one color low frequency halftone object, detect at least one color high frequency halftone object, and/or detect at least one color solid fill object. Thus, generally speaking, step 212 may detect the color object and its specific type.

Method 200 may then determine the approximate area of coverage of the detected object (and/or objects) of step 206 in step 208. A way method 200 may determine the approximate area of coverage of the detected object(s) (e.g., one of the objects 404 through 430) is to count the number of pixels of the detected object in step 214. Counting the number of pixels may be implemented using known processes such as ripping and/or during auto-windowing, for example.

After an object is examined and detected and the approximate area of coverage of the detected object are determined in steps 204-214, the usage profile of each type of detected object is calculated. The "usage profile" of an object is defined as the number of times an object is output (e.g., to be printed or copied) to an output device. The calculation may include counting the number of times a certain type of object is printed, i.e., determining a sum. For example, the received page in step 202 may include two color line art objects 108 and 110 as shown in page 100. Thus, the usage profile for color line art objects would include at least two more counts added to or summed with a pre-existing total. The total of an object's usage profile is defined as the calculated number of times the object is output or printed over a period of time. The total may be zero or higher. The period of time may be defined as the time period between service calls or visits by a customer service technician, engineer, or the like. After the usage profile of each type of detected object(s) (e.g., of step 206) is calculated in step 216, the usage profile is stored, e.g., such as in a memory, in step 218.

Method 200 may then apply a cost function in step 220 to determine or approximate a cost of printing each page by the output device. The cost function uses the at least one detected object (e.g., of step 206), the determined approximate area of coverage of the at least one detected object, and a weight value. A weight value is associated with each type of detected object. The weight value is defined as a value that is associated with each type of object to affect the amount or weight the object has on the service cost. In an embodiment, a weight value is only associated with color objects (not monochrome objects). The weight value of each type of object may be initially set at a standard and adjusted based on the calculated and stored usage profile of the types of detected objected printed (e.g., of steps 216 and 218). The weight value of each object may be increased or decreased based on its usage profile. For example, after a period of time, a weight value associated with color graphic objects may be decreased, while the weight value associated with color high frequency halftone objects is increased. The weight values are used to determine a weighted average and then associated with a weighting of color area coverage to determine a cost C per page. Thus, the cost of printing a page may be increased or decreased based on a calculated usage profile of selected (printed) object types, or, in another embodiment, the cost of printing a page may be customized based on a calculated usage profile.

The cost function referred to within step 220 may be the one as depicted in FIG. 3. Chart 300 depicts several costs that can be used by method 200 of FIG. 2 to approximate the service costs of printing a page. Chart 300 illustrates five determined service costs for printing a page in column 302 that includes costs C1, C2, C3, C4, and C5. Costs C1, C2, C3, C4, and C5 may include the service, may be the service cost, may include other costs, may be used to calculate a few and/or otherwise can be a costs that account (either exactly, approximately, or by estimation) for the service cost of printing a page. Generally, costs C1-C5 are determined based on at least the detected object and the total area coverage. As noted above, in an embodiment, a weighing value or factor W may be used to determine a weighted average for color objects. Thus, in an embodiment, the cost C of a color object may be determined based on at least the detected object, the total area coverage of the object, and a weight value associated with the detected object.

Cost C1, as depicted in row 312 of FIG. 3, may be used to account for the page service cost when a page is a monochrome page wherein the total area of coverage of the monochrome objects is less than threshold T1. Monochrome objects may be detected during step 210 of FIG. 2, for example. Alternatively, cost C2 may also be used to account for the service cost when the page is a monochrome page wherein the total area of coverage of the monochrome objects is greater than or equal to threshold T1, as shown in row 314. Thus, cost C1 is used to capture monochrome pages comprising less content, i.e., low area coverage, while cost C2 is used to capture monochrome pages comprising more content, i.e., high area coverage. The total area of coverage and/or requirements for monochrome objects and/or pages does not need to be determined as depicted in row 312, columns 308-310 and row 314, columns 308-310. However, in other embodiments, the total area of coverage may also be factored in.

Costs C3, C4, and C5 apply to pages that are detected to comprise color objects for output. In an embodiment, the page may also contain significant amount of monochrome objects or a plurality of types of color objects. Cost C3 is used to account for service costs when there are color objects in the page and wherein the total area of the color objects is less than threshold T2. Also, to use cost C3, the page may not include any color graphic objects, color low frequency halftone objects, color high frequency halftone objects, color solid fill objects, or color contone objects, as depicted by the formula shown in row 316, column 310: $G*W1+LFHT*W2+HFHT*W3+SF*W4+CON*W5$=zero. This formula shows expresses that cost C3 is determined when a weighted average is equal to zero, the weighted average being a summation of: (1) the total area of coverage of the color graphic objects (represented by "G") multiplied by a first weight W1, (2) the total area of coverage of the low frequency halftone objects (represented by "LFHT") multiplied by a second weight W2, (3) the total area of coverage of the high frequency halftone objects (represented by "HFHT") multiplied by a third weight W3, (4) the total area of coverage of the solid fill objects (represented by "SF") multiplied by a fourth weight W4, and (5) the total area of coverage of the contone objects (represented by "CON") multiplied by a fifth weight W5. Thus, cost C3 is used to capture pages comprising color objects that have less area coverage and only color text or lines arts content. The pages used with cost C3 do not have color images or graphics content and thus are low service cost.

Cost C4 is determined to be the account for the service cost of printing page 402 (see FIG. 4) when the total area of coverage of the color objects is less than threshold T3 and a weighted average is less than threshold T4. Specifically, referring to row 318, column 310 of chart 300 for the formula: $G*W1+LFHT*W2+HFHT*W3+SF*W4+CON*W5 <$ threshold T4. The formula of row 318, column 310 expresses that cost C4 is determined when a weighted average is less than threshold T4, wherein the weighted average is a summation similar to that as noted above with respect to cost C3. Cost C4 is used to capture pages comprising color objects that have relatively low area coverage and some color images or graphics content.

Cost C5 is determined to include the estimated service cost of printing a color page when that particular page has objects that place the page outside the requirements to use costs of C3 and/or C4 (note that costs C1 and C2 are associated with approximated costs of purely monochrome pages). Referring to row 320, cost C5 is used for all other accounts for the service cost of a page when the total area of coverage of color objects of the page does not fall below any of thresholds T1, T2, or T3. Thus, the total area of coverage of the color objects on the page is greater than or equal to a threshold T4. Specifically, referring to row 320, column 310, the weight average, as represented by the formula $G*w1+LFHT*w2+HFHT*w3+SF*w4+CON*w5$, must be greater than or equal to threshold T4. Cost C5 is used to capture pages comprising high area coverage and higher image or graphics content, i.e., full color page cost.

In an embodiment, the total area of coverage of color objects may be equal to a threshold T2 or T3. When the total area of coverage is equal to threshold T2, for example, the cost for printing a page may be determined by cost C4 (row 318). In an embodiment, the total area of coverage of color objects may be equal to threshold T3. Cost C5, therefore, may be used to determine the cost of printing a page when the total area of coverage is equal to T3. In another embodiment, thresholds T3 and T4 may be equivalent. That is, T4 may be equal to T3, and, therefore, the cost C5 (row 320) may account for all color objects on a page that are greater than or equal to T3 (i.e., $G*w1+LFHT*w2+HFHT*w3+SF*w4+CON*w5$ must be greater than or equal to threshold T3).

Though FIG. 3 and the above noted costs C1-C5 are described with reference to specific thresholds, it should be noted that the above noted thresholds T1-T4 are exemplary embodiments for calculating the service costs C1-C5 for printing pages, and, therefore, should not be limiting. Generally, several different methods or calculations may be used for the determination of thresholds T1-T4 and/or weight values for determining the service costs/cost function 220 for printing objects in a page. Also, any number of thresholds T may be used to determine any number of costs C for printing a page, and, therefore, the determination or calculation of the cost C should not be limited to the thresholds and/or formulas as described herein.

Using the cost function as depicting in chart 300 thus allows for 5 different costs C1, C2, C3, C4, and C5 to be determined for printing a page. However, referring back to FIG. 2, in an embodiment, method 200 may use an alternative cost function in step 220 that uses a weight average of the various areas of coverage of any detected objected within a page (e.g., page 402). Additionally, in yet another embodiment, a non-linear cost function may determine costs by using one or more of the detected objects found within the page.

Once a cost C1-C5 is determined for a page, the cost C1-C5 is generally stored (e.g., such as in a memory or counter/calculating device) for retrieval at a later date. Each cost per page printed may be stored over a period of time until accessed. For example, when a user calls for service on an output device or MFP, the service technician or engineer may retrieve the cost information from the memory device or counter device for the period of time from the last service, and such information may be used to bill the user or customer for the printing service costs.

The counter devices (or otherwise) that are pulled by the technician are also used to update the weight value for each object type being printed by the output device or MFP. For example, the weight value associated with each type of object may be adjusted based on its usage profile over the period of time. For example, referring to the cost function shown in chart 300 of FIG. 3, if a user has printed a plurality of color solid fill objects (e.g., SF) but less color graphic objects (e.g., "G"), the weight value W1 associated with color graphic objects may be lowered, while the weight value W4 associated with color solid fill objected is raised. Hence, the service cost is also associated and adjusted according to the type of objects detected and printed, providing the user with a customized method of billing. This is particularly beneficial for a user who, during one period of time prints mostly monochrome objects and during another period of time prints color objects, as the service needs during the first period may require less service (i.e., less billing), while the service needs during a second period may require more service (i.e., higher billing).

The usage profile may also provide customized billing by using records of service requests therewith. For example, if a user has printed a significant amount of graphics G, high frequency halftone HFHT, and contone CON color objects without any complaints or need for service, but has made a service request only after printing a smaller amount of solid fill SF objects, it can be noted that rendering and printing solid fill SF objects are important to the user. Thus, the weight value W4 associated with solid fill SF objects would be weighed higher (i.e., increased) as compared to the other objects.

In both of the above described methods the multi-tier billing costs for printing will generally remain substantially the same, while the weight values associated with certain objects types are changed or adjusted based on based on the usage data. Traditional approaches rely on fixed service cost(s) and do not account for the usage profile of the customers; that is, the cost of printing monochrome and/or color objects in the prior art is approximated by counting a number of pixels, and, generally does not account for how the color pixels are distributed in a page (e.g., how the pixels are distributed and/or clustered), the kinds of objects in the page the pixels are used to form, or the pixel density. Thus, in prior art methods, the calculations of the service costs per page are static and do not track the actual service cost incurred based on composition (e.g., types of objects printed) of the document. The dynamic capability of adjusting the weight value and, hence, the cost for printing each page, as noted in the method herein described is useful as a plurality of different types of documents (and workflows) are produced (e.g., printed, copied) in the marketplace.

Further, such a method also provides the capability to target a unique cost profile per user or customer based on their individual usage profile. In an embodiment, the usage profile of the printed objects may be used to provide additional incentives to users or customers so as to encourage them to print more color pages. For example, if a customer had printed "X" pages of color halftone content such as high frequency halftone content and low frequency halftone content, wherein the sum of that color halftone content is lower than a threshold (e.g., HFHT and LFHT>a predetermined threshold), and has not needed service, the usage profile information may be used to offer the user or customer a reduction in the per page cost of printing color pages. The multi-tier billing costs for printing using the above described incentive method will continuously change based on the objects and content printed in the pages, and the user will see a reduction in page cost based on the usage data.

Thus, the usage profile data may be used to customize the method of billing (i.e., provide a unique cost profile) for each individual user or may be used globally to correcting the overall pricing model for all users or customers.

Referring to FIG. 4, a billing system 400 is shown and may be implemented by using software executable instructions. Additionally or alternatively, billing system 400 and its various modules may include hardware, software, software in execution, firmware, and/or some combination thereof. Specifically, method 200 may be implemented using system 400 comprising a processing module 432 that includes processor 434 and memory 436. System 400 also comprises an examination module 438, usage calculation module 440, and cost calculation module 442. Examination module 438 may include coverage module 444 and detection module 446. Also shown in FIG. 4 is page 402 which illustrates a representative page that billing system 400 may use to determine the service cost associated with the page.

Examination module 438 may examine the content of page 402. The examination may be accomplished using detection module 446 that may detect one or more objects in page 402. Coverage module 444 may determine the approximate area of coverage of a detected object detected by detection module 446. Coverage module 444 may count the number of pixels of the detected using techniques such as ripping or auto-windowing, as previously noted. Examination module 438 may operatively communicate with usage calculation module 440 and cost calculation module 442. Usage calculation module 440 may determine the usage profile of each type of detected object 404 through 430 (or otherwise objects detected within another page not depicted), i.e., count or sum the number of times an object is printed. Cost calculation module 442 may use the cost function described in FIG. 3 to approximate a cost of printing page 402 using objects 404 through 430 (or otherwise objects detected within another page not depicted).

Additionally or alternatively, cost calculation module 442 may use any cost function discussion herein. Also, in an embodiment, processor 434 may be used in addition to or alternative to usage calculation module 440 and/or cost calculation module 442. Memory 436 may be used to store the usage profile information of each type of detected object. Memory 436 may also be used to store the cost calculations made by cost calculation module 442.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will thus be seen that the objects of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A computer-implemented method of billing for printing service costs of a printing device, the printing device comprising a plurality of modules implemented on at least one processor and a storage memory and being configured to print documents comprising at least one page, wherein the method is implemented by the printing device, the method comprising the printing device implemented steps of:
    examining content of each page in the documents using an examination module, the examining comprising:
    (i) detecting at least one object in the page;
    (ii) determining a type of the at least one detected object within the page, and
    (iii) determining an approximate area of coverage of a detected object within the at least one object in the page;
    calculating a usage profile of each type of detected object for output using the printing device using a calculation module, the usage profile including at least a number of times that the detected object is output over a period of time using the printing device;
    storing the usage profile of each type of detected object in the memory; and
    applying a cost function to approximate a cost of printing the page using the at least one detected object, the determined approximate area of coverage of the at least one detected object, and a weight value, the weight value being associated with the type of the at least one detected object and determined based on at least the stored usage profile, wherein the approximate cost of printing for each page printed by the printing device is determined based on the applied cost function.

2. The method according to claim 1, wherein the weight value associated with each type of detected object is adjusted based on the usage profile of the types of detected objects printed over a period of time.

3. The method according to claim 1, wherein the weight value associated with an object is decreased based on its usage profile.

4. The method according to claim 1, wherein the weight value associated with an object is increased based on its usage profile.

5. The method according to claim 1, wherein detecting the at least one object in the page further comprises detecting at least one color object or at least one monochrome object.

6. The method according to claim 1, wherein the at least one object in the page includes at least one selected from the group consisting of a monochrome contone object, color contone object, monochrome text object, color text object, monochrome line art object, color line art object, monochrome graphic object, color graphic object, monochrome low frequency halftone object, color low frequency halftone object, monochrome high frequency halftone object, color high frequency halftone object, monochrome solid fill object, and color solid fill object.

7. The method according to claim 1, wherein determining an approximate area of coverage of a detected object comprises counting a number of pixels of the detected object.

8. A billing system for printing service costs of a printing device for printing documents comprising at least one page, the billing system comprising:
    at least one processor;
    an examination module executable by the at least one processor, configured for examining content of a page, the examination module comprising:
    (i) a detection module executable by the at least one processor, configured for detecting at least one object in the page and detecting a type of the at least one object, and
    (ii) a coverage module executable by the at least one processor, configured for determining an approximate area of coverage of a detected object within the at least one object in the page;
    a calculation module executable by the at least one processor, configured for calculating a usage profile of each type of detected object for output using the printing device, the usage profile including at least a number of times that the detected object is output over a period of time using the printing device;
    a storage memory for storing the usage profile of each type of detected object; and
    a cost calculation module configured for applying a cost function to approximate a cost of printing the page using the detected object, the determined approximate area of coverage of the detected object, and a weight value, the weight value being associated with the type of the at least one detected object and determined based on at least the stored usage profile.

9. The billing system according to claim 8, wherein, upon calculating the printing service costs over a period of time, the cost calculation module adjusts the weight value associated with each type of detected object based on the usage profile of each type of detected object.

10. The billing system according to claim 8, wherein the weight value associated with an object is decreased based on its usage profile.

11. The billing system according to claim 8, wherein the weight value associated with an object is increased based on its usage profile.

12. The billing system according to claim 8, wherein the cost of printing the page is decreased based on the calculated usage profile of selected object types.

13. The billing system according to claim 8, wherein the cost of printing the page is increased based on the calculated usage profile of selected object types.

14. The billing system according to claim 8, wherein the cost of printing the page is customized based on the calculated usage profile.

15. The billing system according to claim 8, wherein the detection module detects at least one color object or at least one monochrome object in the page.

16. The billing system according to claim 8, wherein the detection module detects at least one selected from the group consisting of a monochrome contone object, color contone object, monochrome text object, color text object, monochrome line art object, color line art object, monochrome graphic object, color graphic object, monochrome low frequency halftone object, color low frequency halftone object, monochrome high frequency halftone object, color high frequency halftone object, monochrome solid fill object, and color solid fill object.

* * * * *